United States Patent [19]

Resz et al.

[11] 4,366,288
[45] Dec. 28, 1982

[54] PULVERULENT COATING MATERIALS

[75] Inventors: Raoul Resz, Bergisch-Gladbach; Walter Schäer, Cologne; Aziz El Sayed, Leverkusen, all of Fed. Rep. of Germany

[73] Assignee: Bayer Aktiengesellschaft, Leverkusen, Fed. Rep. of Germany

[21] Appl. No.: 199,697

[22] Filed: Oct. 23, 1980

[30] Foreign Application Priority Data

Oct. 27, 1979 [DE] Fed. Rep. of Germany ....... 2943469

[51] Int. Cl.³ .......................... C08F 8/00; C08F 16/06; C08F 26/04; C08F 116/06
[52] U.S. Cl. ....................................... 525/60; 525/61; 427/27

[58] Field of Search ..................................... 525/60, 61

[56] References Cited

U.S. PATENT DOCUMENTS 3,480,591  11/1969  Oertel et al. .......................... 525/60
3,616,191  10/1971  Fuerholzer et al. .................. 525/61
3,875,090   4/1975  Levy ..................................... 525/61
4,276,390   6/1981  Nakabayaski et al. ............... 525/61

Primary Examiner—Norman Morgenstern
Assistant Examiner—Janyce A. Bell
Attorney, Agent, or Firm—Connolly and Hutz

[57] ABSTRACT

Pulverulent coating materials consisting of saponified ethylene vinyl acetate copolymers and, as cross-linking agents, polycarbodiimides and/or polyuretone imines.

4 Claims, No Drawings

PULVERULENT COATING MATERIALS

This invention relates to pulverulent coating materials, which cure at temperatures above the melting point, based on saponified ethylene-vinyl acetate copolymers and additives which cross-link, and also relates to the coatings which are prepared therefrom.

Saponified ethylene-vinyl acetate copolymers which, before saponification, contain polymerised units of ethylene and vinyl acetate in molar ratios of from 2:1 to 20:1, and which are saponified to a hydrolysis level of more than 50%, are suitable for coating articles made of metal, ceramics, glass, plastics and wood according to various known methods for immersion and spray coating processes, e.g. whirl sintering, flame spraying or electrostatic powder spraying process (EPS). The use of these coating materials is admittedly restricted to the case where dimensional stability at temperatures above the softening or melting point of the coatings produced therefrom is unnecessary. In many cases, therefore, it is impossible to use the coating materials, e.g. for coating metal pipes which are exposed to hot liquids or through which materials of this type are conveyed, or for coating metal components which are located near hot objects or machine parts, or also for coating multipath glass bottles which have to endure being washed at relatively high temperatures (from 70° to 90° C.).

It is known that generally by cross-linking copolymers of this type, but particularly by adding compounds which are able to react in a bi- or polyfunctional manner with the hydroxyl groups contained in the polymer, infusible polymer coatings may be obtained. Admittedly, there is a prerequisite that these compounds which cross-link only exhibit their effect at higher temperatures, i.e. substantially above the melting point of the polymer, that is that they may be worked into the polymer without becoming actively cross-linking. Also, during storage of the coating powder, they should not become ineffective in the presence of air or atmospheric moisture even after relatively long periods of time. The following have hitherto been suggested as cross-linking additives: di- and polyfunctional carboxylic acids, carboxylic acid anhydrides, carboxylic acid chlorides and isocyanates and also those compounds which release compounds containing isocyanate groups during thermal decomposition in the temperature range of from about 100° to 250° C.

This latter group of compounds includes those which are converted into di- or polyisocyanates during the dissociation of so-called blocking or masking agents. The following are suitable as masking agents: e.g. phenols, lactams, oximes, compounds containing active methylene groups, acid amides, imidazole and some of the derivatives thereof, sulphites, imines, ureas, alcohols, mercaptans, imides and amines.

These masked isocyanates have the common characteristic of splitting off such masking agents during the cross-linking process, the masking agents being either volatilised at the cross-linking temperature or remaining as involatile, but low-molecular-weight compounds in the polymer layer. The first-mentioned masking agents produce a more or less strong smell when processing the coating powder and many of these volatile substances are also hazardous to health. Readily volatile masking agents also frequently create disturbances as a result of bubble formation in the plastics layer during processing, which is a great disadvantage to the quality of the coatings. On the other hand, difficultly volatile but low-molecular-weight blocking agents are frequently incompatible with the saponified ethylene-vinyl acetate-polymers and they exert an unfavourable effect on the characteristics of the coatings in terms of use, that is particularly on their tensile strength, solidity, resistance to solvents, surface finish, resistance to chemicals and their adhesiveness to various backings, to mention but a few. Therefore, there is a pressing need for cross-linking substances which do not split off any low-molecular-weight blocking agents during the cross-linking reaction, but either decompose into di- or polyfunctional compounds or into a mixture of such with monofunctionally reacting compounds. The first mentioned produce the required cross-linking above the decomposition temperature, in contrast to which the latter are able to react monofunctionally with the polymer chain and consequently are given off to a substantially smaller extent when the coating is stoved, or remain in the coating as an involatile admixture which however may be dissolved out using solvents.

It has been found that polycarbodiimides of the general formula (1):

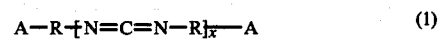

in which
R represents a (cyclo) alkylene-, aralkylene- or arylene group,
A represents an isocyanate group blocked by a Zerewitinov-active compound, or hydrogen, and
x represents an integer from 2 to 20,
are able to react at higher temperatures, forming structures of the following type:

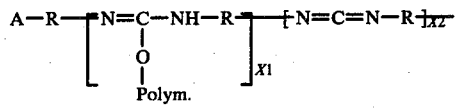

wherein $X_1 + X_2 = 2$ to 20 with saponified ethylene-vinyl acetate copolymers which, before saponification, contain ethylene and vinyl acetate in a molar ratio of from 2:1 to 20:1 and which are saponified to a hydrolysis level of more than 50%. Thereby, temperature-resistant coatings are produced on objects made of metal, ceramics, glass, wood, or plastics. The terminal groups characterised by A are here preferably hydrogen or such blocked isocyanate groups which release the blocking agent at substantially higher temperatures than the temperature at which the reaction indicated above takes place. They may also be those having lower decomposition temperatures, but generally in their presence cross-linking is not completely achieved without releasing a blocking agent, but predominantly only a decrease in the dissociated quantity of blocking agent. In many cases, this is also admittedly a great advantage in comparison to the conventional known blocked di- or polyisocyanates of the type mentioned above and it is another object of the present invention. Apart from the polycarbodiimides mentioned above, blocked polycarbodiimides such as polyuretone imine-derivatives, in which the polycarbodiimide chains are bonded together according to formula (2):

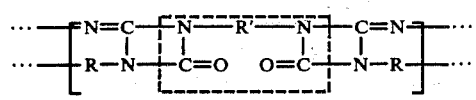

by incorporating organic diisocyanates, are also suitable as cross-linking agents because they produce cross-linking active polycarbodiimides during the thermal dissociation, and furthermore because isocyanate groups are also thereby simultaneously released and then cause an additional cross-linking of the polymers containing hydroxyl groups.

The polymer-cross-linker combinations according to the invention, used in powder form according to the coating methods mentioned above, produce infusible coatings which, in comparison to the non-cross-linked materials, are clearer, harder, more elastic and more resistant to cold. Admittedly, they have to be stoved at raised temperatures in one of the subsequent process steps after melting on the powder, as is usually the case for subsequently thermosetting lacquers.

The invention provides coating materials, consisting of (a) from 50–99% by weight of saponified ethylene-vinyl acetate copolymers which contain ethylene and vinyl acetate in molar ratios of from 2:1 to 20:1 before saponification and which are saponified to hydrolysis levels of from 50 to 100%, and (b) from 1 to 50% by weight of polycarbodiimides, having cross-linking activity at temperatures above 130° C., of the general formula (1):

$$A-R+N=C=N-R\}_x-A \qquad (1)$$

wherein

R represents a (cyclo)alkylene-, aralkylene- or arylene group,

A represents hydrogen or a blocked isocyanate group having dissociation temperatures of above 130° C., and x represents an integer from 2 to 20 and/or polyuretone imines, in which the polycarbodiimide molecules having the structures as stated above, are bonded together according to the general formulae (2) and (3):

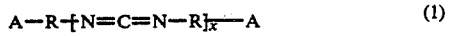

or

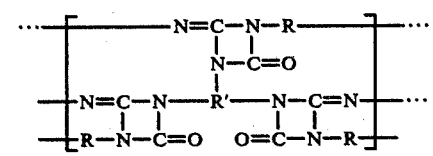

wherein R' is a bi- or tri functional organic radical, by a reaction with (cyclo)aliphatic, araliphatic or aromatic di- or triisocyanates, the total of components (a) and (b) being 100%.

The polycarbodiimides of the general formula (1) stated above are obtained from polyisocyanates by heating in the presence of suitable catalysts and by adding Zerewitinov-active compounds and/or monoisocyanates. Their preparation is described e.g. in U.S. Pat. Nos. 2,941,983 and 2,041,966 and in J. Org. Chem. 28, 2069 (1963). Those polycarbodiimides are preferred for the compositions of the invention which have terminal groups A, produced by the reaction of a Zerewitinov-active compound with an isocyanate group. Polycarbodiimides are particularly preferred which are terminated by urethane groups. Those polycarbodiimides are also preferred in which A represents hydrogen and —R—A is the aliphatic, araliphatic or aromatic radical of a monoisocyanate.

These terminated polycarbodiimides may be prepared by preferably heating diisocyanates with or without a solvent in the presence of from 0.001 to 5% by weight of a carbodiimidisation catalyst containing phosphorus to a temperature of between 25° and 250° C.

Before, during or after carbodiimidisation, monoalcohols or monoisocyanates are also added to the reaction mixture. Where monoalcohols are used, the molar ratio of the alcohol to the diisocyanate is from 0.5:1 to 0.1:1, and where the monoisocyanate is used, the molar ratio of the isocyanate to the diisocyanate is from 1:1 to 0.1:1. The mixture is heated to from 25° to 250° C. and the $CO_2$-evolution is measured using a gas meter until it has ceased. The carbodiimide content of the reaction product may be determined from the quantity of $CO_2$.

The blocked polycarbodiimides, the polyuretone imines, are formed as a result of a 2+2 cycloaddition between an isocyanate group and a carbodiimide group while adding an isocyanate to the polycarbodiimide, in which copper salts in particular act on this ring formation in a catalytic manner. The preparations of uretone imines is known and is described e.g. in German Auslegeschrift No. 1,012,602 and J. Org. Chem. 33, 1913, (1968).

Polyuretone imines which are preferred according to the invention are produced by allowing a diisocyanate to react in the presence of from 0.001 to 5% by weight of a carbodiimidisation catalyst containing phosphorus until from 40 to 90% of the isocyanate groups are converted (detectable by means of the quantity of carbon dioxide evolved). The reaction product is then left for from 10 to 60 minutes at a temperature of from 70° to 140° C., optionally in the presence of from 0.05 to 1% by weight of a ring-forming catalyst, and is then cooled. Products are produced which may contain uretone imine groups or even still isocyanate or carbodiimide groups. Isocyanate groups which are still present are then reacted with Zerewitinov-active compounds at temperatures of from 0° to 50° C.

As starting materials for the preparation of polycarbodiimides or blocked polycarbodiimides (polyuretone imines), the aliphatic, cycloaliphatic or araliphatic polyisocyanates which are known per se in polyurethane chemistry, may be used, e.g.: 1,4-tetramethylenediisocyanate, 1,5-pentamethylenediisocyanate, 1,6-hexamethylenediisocyanate, 2,2,4- and 2,4,4-trimethyl-1,6-diisocyanatohexane, 1,11-undecamethylenediisocyanate, 1,12-dodecamethylenediisocyanate, 1,2-diisocyanatomethylcyclobutane, 1,4-diisocyanatocyclohexane, dicyclohexyldiisocyanate, dicyclohexylmethane-4,4'-diisocyanate, p- and m-xylylenediisocyanate, 1-methyl-2,4-diisocyanatocyclohexane, 1-methyl-2,6-diisocyanatocyclohexane, 3-isocyanatomethyl-3,5,5,-trimethyl-cyclohexylisocyanate (=isophoronediisocyanate), α,ω-diisocyanatocaproic acid ester having from 1 to 8 carbon atoms in the alcohol radical.

Alicyclic isocyanates are particularly suitable, e.g.: 1-isocyanato-3,3,5-trimethyl-5-isocyanatomethylcyclohexane, cyclohexane-1,4-diisocyanate, 4,4'-diisocyanato-dicyclohexylmethane, 2,4- and 2,6-diisocyanato-1-methylcyclohexane mixture (ratio of 80:20). The following are also very suitable: hexamethylenediisocyanate, 2,2,4- and 2,4,4-trimethylhexamethylenediisocyanate, polyisocyanates containing oxadiazinetrione groups and/or uretdione groups, biuret- or isocyanurate groups, based on hexamethylenediisocyanate and 1-isocyanato-3,3,5-trimethyl-5-isocyanatomethylcyclohexane, and also mixtures thereof.

In order to prepare the polycarbodiimides or blocked polycarbodiimides (uretone imines), mixtures may also be used which consist of aliphatic or cycloaliphatic isocyanates and aromatic isocyanates. The following are preferred aromatic diisocyanates, e.g.: 1,3- and 1,4-phenylene diisocyanate, 2,4- and 2,6-tolylene diisocyanate and any mixtures of these isomers, diphenyl methane-2,4', and/or -4,4'-diisocyanate, naphthylene-1,5-diisocyanate, diisocyanates as described in U.S. Pat. No. 3,492,330; polyisocyanates having allophanate groups, as described for example in British Pat. No. 994,890, Belgian Pat. No. 761,626 and the published Dutch patent application No. 7,102,524.

It is in principle also possible to use or concomitantly use aliphatic diisocyanates or to concomitantly use aromatic diisocyanates as they are produced by reacting excess diisocyanate with difunctional compounds carrying OH- or NH-groups and are to be encountered in the practice of polyurethane chemistry either as "modified isocyanates," or as "isocyanate prepolymers." The involvement of such modified isocyanates, according to the selection of the chain length or the chemical character of the OH- and NH-compounds, e.g. glycol, diglycol, polyether, polycarbonates or polyesters, allows the preparation of other variations of the polycarbodiimides. Zerewitinov-active compounds which are used as a starting material for the preparation of the polycarbodiimides and the blocked polycarbodiimides, are e.g. methanol, ethanol, cyclohexanol, phenol, mercaptan, methylamine, ethylamine, butylamine, dibutylamine, cyclohexylamine, aniline, 1,2,4-triazole, ε-caprolactam, pyrrolidone, malonic acid diethyl ester and acetoacetic ester.

Zerewitinov-active compounds which are added during or after carbodiimidisation are compounds which react faster with isocyanate groups than with carbodiimide and uretone imine groups, for example methanol, ethanol, cyclohexanol and phenol.

Those Zerewitinov-active compounds are preferably used whose reaction products with isocyanate groups are only decomposed at temperatures above 180° C., e.g. methanol, ethanol, cyclohexanol, methylamine, ethylamine, cyclohexylamine and aniline.

Monoisocyanates, which are used as a starting material for the preparation of the polycarbodiimides, are e.g. hexyl isocyanate, cyclohexyl isocyanate, phenyl isocyanate and tolyl isocyanate.

The uretone imine content of the blocked carbodiimide may be determined by heating the polycarbodiimide to 180° C. whereby a carbodiimide group and an isocyanate group are released with the dissociation of a uretone imine group. The isocyanate is then determined as usual by using di-n-butylamine.

In the preparation of the polyisocyanato carbodiimide addition products, to be used according to the invention, all catalysts which are usually used to convert isocyanate groups into carbodiimide groups may be used as the carbodiimide-forming catalysts. Examples of these are compounds containing phosphorus such as triphenyl phosphine oxide, phospholine oxides or phospholane oxides and the sulphides thereof, compounds as described for example in U.S. Pat. Nos. 2,663,737; 2,663,738; 2,663,739 and 2,853,473.

As the carbodiimidisation catalyst, a mixture of 1-methyl-1-phospha-2-cyclopentene-1-oxide and 1-methyl-1-phospha-3-cyclopentene-1-oxide is preferred which is added to the isocyanate in quantities of from 0.1 to 5% by weight. The reaction temperature is generally from 80° to 250° C.

The preparation of the polycarbodiimides to be used according to the invention is preferably carried out in solvents e.g. toluene, xylene or decalin, but may also take place in bulk, e.g. in a reaction coil.

Such saponified ethylene-vinyl acetate copolymers are used as components of the polymer powder according to the invention which contain ethylene and vinyl acetate in molar ratios of from 2:1 to 20:1, preferably from 4:1 to 10:1, before saponification and in which the acetyl groups are saponified to more than 50%, preferably to from 80 to 100%. Such polymers contain from 65 to 95, preferably from 80 to 91 mol %, of ethylene polymerised therein.

The ethylene-vinyl acetate copolymers may basically be prepared according to all known methods, e.g. bulk, solution and emulsion polymerisation processes, but they are preferably prepared according to the polymerisation process described in German Pat. No. 1,126,613, in a liquid phase predominantly consisting of tert. butanol, at pressures of less than 800 bar, preferably between 200 to 500 bar pressure.

The ethylene-vinyl acetate copolymers, used for the preparation of the coating powders according to the invention, may be saponified according to any known methods in the presence of alkaline or acidic catalysts, in alcohols or with higher contents of ethylene polymerised therein in mixtures of alcohols using solvents which are inert under saponification conditions. The saponification or alcoholysis and isolation of the polymers containing the cross-linking agent are preferably carried out in powder form according to the method described in German Offenlegungsschrift No. 2,611,548, as this allows the cross-linking agent to be distributed regularly in the polymer powder by means of a common precipitation of the two components from the saponification solution in water. In this process, saponification is carried out in an organic solvent mixture which has the characteristic of homogeneously dissolving the saponification product and the cross-linking agent at higher temperatures and then gelling at lower temperatures of from about 30° to 80° C. The gelling solution is then crushed mechanically in water and the readily volatile organic solvent clinging to the product is removed by means of steam distillation.

Other possibilities of working the cross-linking agent into the saponified ethylene-vinyl acetate copolymers are e.g. mixing the two components in melted condition above the melting point and below the cross-linking point, i.e. in the temperature range of from about 100° to 150° C., and grinding the obtained granulate, optionally while using liquid nitrogen as a cooling agent. Another feasible method consists of treating the powder of the dry, saponified ethylene-vinyl acetate copolymer with a solution of the cross-linking agent in a solvent which allows the polymer powder to swell considerably but not to dissolve, and either directly drying the product or removing the organic solvents by means of steam distillation of the organic solvents and drying the water-moist product.

In order to slightly modify the characteristics of the saponified ethylene-vinyl acetate copolymers, e.g. to improve their adhesiveness to certain substrate surfaces, these may be slightly modified, i.e. the free hydroxyl groups contained therein are reacted to a certain extent, to a maximum of approximately 25%, with those compounds which involve the introduction of free carboxy groups. Compounds of this type are e.g. cyclic di- or tricarboxylic acid anhydrides such as succinic acid anhydride, glutaric acid anhydride, maleic acid anhydride, phthalic acid anhydride, tetrahydrophthalic acid anhydride, hexahydrophthalic acid anhydride and trimellitic acid anhydride. Ethylenically unsaturated compounds containing free hydroxyl groups may also be grafted onto the polymers in the presence of radical polymerisation initiators, e.g. in the presence of organic peroxides and azo compounds. Examples of the ethylenically unsaturated compounds are acrylic acid, methacrylic acid, itaconic acid, or such compounds which are converted into the previously mentioned compounds by means of hydrolytic dissociation, e.g. maleic acid anhydride.

The quantity of the carboxyl groups introduced according to these methods should admittedly only be limited because their presence increases more and more the hydrophilicity of the coatings and their alkali-sensitivity. When using the polyuretone imine derivatives which release free isocyanate groups at high temperatures, a more or less undesired heavy bubble formation may also appear in the coating.

Since free carboxyl groups react substantially more easily with polycarbodiimides than the hydroxyl groups, the cross-linking temperature becomes increasingly lower with an increasing content of carboxyl groups, especially as the acyl urea, produced hereby, causes additional cross-linking as an isocyanate donor. In an unfavourable case, this can lead to the fact that the coating material reacts prematurely when being melted, i.e. even before it can flow smoothly. As a result of this, irregular, wavy coatings are produced.

Coating may be carried out according to all known methods of powder coating technology, e.g. according to the whirl sintering process, the electrostatic powder spraying process, by means of flame spraying or rotation casting, but it is necessary that after melting of the coating, the material is cured by heating to higher temperatures. For this purpose, temperatures of from 160° to 220° C., preferably from 180° to 200° C. and stoving times of from 5 to 60, preferably from 10 to 30 minutes are generally required. In order to increase the adhesiveness of the polymer to the backing, it is expedient in many cases to carry out a pre-treatment of the surface to be coated, i.e. either by applying an adhesive layer or by means of a chemical pre-treatment. It is particularly favourable to use primers to firmly anchor the plastics coating, which are able to react with the carbodiimide groups or with the isocyanate groups which are released when the polyuretone imines decompose. In this manner, a direct chemical bonding between the coating and the backing is produced. The following are very suitable for this purpose: e.g. the alkyl-tris-alkoxy silanes which contain reactive groups and are known as adhesives for glass and metal. When using adhesives, their thermal resistance must admittedly be considered as they are able to decompose or change at more or less high temperatures and then frequently act as separating agents instead of as adhesives. In many cases, in order to obtain sufficient adhesion of the coating to the surface of the object to be coated, a thorough cleaning or a mechanical roughening, e.g. by means of sand blasting, will suffice.

EXAMPLE 1

(A) Preparation of the Polycarbodiimide Cross-Linker 560 g of isophorone diisocyanate are reacted with 36 g of methanol with the addition of 0.1 g of tin di-2-ethyl-hexoate as the catalyst, in 2000 ml of xylene at 45° C. within 2 hours. After adding 6.68 g of 1-methyl-phospholine oxide to the reaction mixture, it is heated to 137° C. until an isocyanate band can no longer be detected in the infrared spectrum. After removing the solvent in a rotary evaporator in a water jet vacuum, a tough resin is obtained.

(B) Preparation of the coating powder 2500 g of an ethylene-vinyl acetate copolymer, having a content of 32.0% by weight of vinyl acetate which corresponds to an ethylene-vinyl acetate molar ratio of 6.5:1, are dissolved in 250 g of dry toluene in a vessel equipped with a stirrer at approximately 80° C., and a solution of 25 g of sodium methylate dissolved in 1300 g of methanol is added to the solution which is cooled to approximately 60° C. The reaction mixture is boiled for 1 hour under reflux and a total of 1200 ml of distillate are then distilled off using a packed column at a rate of 24 parts by volume/hour. The transesterification catalyst is then decomposed by adding 2.5 parts by weight of water. The solution of 250 g of the cross-linker prepared in part A of this Example, dissolved in a three-fold weight of toluene, is added to the clear solution thus obtained. After homogeneously mixing the two solutions, the warm solution is suspended in water at approximately 55° C. according to the process described in German Offenlegungsschrift No. 2,611,548 and the clinging organic solvent mixture is removed by means of steam distillation at a reduced pressure of approximately 100 mm Hg. The material obtained in the form of a coarse powder is filtered off and dried under reduced pressure at from 50° to 60° C. The product obtained in a quantity of 2190 g is ground and is divided up by sieving into grain fractions of <80 μm, from 80 to 200 μm and from 200 to 500 μm grain size. The grain fraction of from 80 to 200 μm in diameter of the obtained product is filled into a fluid bed and a one liter glass bottle which has been previously heated to 250° C. in a heating chamber is immersed for seven seconds into the whirled powder. The powder now melts onto the bottle in the form of an approximately 400 μm thick coating. The initially slightly cloudy and brittle layer, after being heated for 15 minutes at 190° C. produces a glass-clear, smooth, firm and elastic coating which, even at temperatures above 100° C. is not sticky and has a substantially improved flexibility and strength and also an improved adhesiveness to glass compared with the coating which was obtained by using the cross-linker-free coating powder of the same composition according to Comparative Example 1.

EXAMPLE 2

(A) Preparation of the Polyuretone imine cross-linker 222 g of 1-isocyanatomethyl-5-isocyanato-1,3,4-trimethyl-cyclohexane (isophorone diisocyanate) and 0.4 ml of a mixture 1-methyl-1-phospha-2-cyclopentene-1-oxide and 1-methyl-1-phospha-3-cyclopentene-1-oxide are heated under nitrogen at 160° C. until 1 liter of carbon dioxide is produced within 2 hours. The liquid product is cast onto a metal sheet where it solidifies into a readily pulverisable composition at a temperature below 50° C.

The product melts at 89° C. The titration carried out at room temperature of the NCO-group gave a result of 11% by weight and titration carried out at 180° C. gave a result of 17% by weight.

(B) Preparation of the coating powder

The solution of 250 g of the uretone imine prepared from isophorone diisocyanate according to the above method is added to the saponification solution of the same EVA-copolymer prepared as described under Example 1B, and the product is isolated in powder form as described there.

Using the powder fraction, obtained by grinding and sieving, of grain size <80 μm, sand-blasted steel plates are coated according to the electrostatic powder coating process, and the coating is stoved at 190° C. for 15 minutes. Approximately 200 μm thick coatings are obtained which, in comparison to those which were obtained using the coating powder prepared according to Comparative Example 1, exhibited an improved temperature resistance, a brighter gloss, an improved elasticity and tensile strength, and not least an improved adhesion.

EXAMPLE 3

(A) Preparation of the Polyuretone imine Cross-Linker Blocked using Methanol 0.8 ml of 1-methyl-phospholine oxide are added under nitrogen to a solution of 444 g of isophorone diisocyanate dissolved in 336 g of xylene. The reaction mixture is then heated to 140° C. until 28 liters of carbon dioxide are produced after approximately 4 hours. The quantity of carbon dioxide is measured using a gas meter. 50 g of methanol and 0.1 g of tin di-2-ethyl hexoate are then added to the reaction mixture at room temperature. After removing the solvent in a water jet vacuum, a strong resin is obtained which becomes firm and pulverisable after some time.

(B) Preparation of the Coating Powder

The coating powder was prepared according to Example 1 with the difference that, as the cross-linker, 500 g of the solution of the saponification product, prepared as described under section (A) of this Example, were added. The objects of metal and glass, coated with this powder, exhibit similarly favourable characteristics as those prepared according to Examples 1 and 2, and improved characteristics in comparison to those which were coated using the powder prepared according to Comparative Example 1.

EXAMPLE 4

2 kg of the grain fraction <80 μm of the coating powder prepared according to Comparative Example 1 are suspended in 20 kg of water and the solution of 250 g of the polycarbodiimide cross-linker, prepared according to Example 1, in 1 kg of toluene is added to the suspension. The toluene is then removed from the suspension by means of steam distillation under reduced pressure of from about 50 to 80 torr, the powder is filtered off and dried under vacuum at 60° C.

The quality of the coatings prepared using the powder according to the EPS-process on glass or metal objects corresponds to some extent to the quality of the coatings prepared according to Example 1 by means of whirl sintering where the cross-linker is added in dissolved form to the solution of the saponification product.

EXAMPLE 5

2 kg of the grain fraction of from 80 to 200 μm in diameter of the coating powder prepared according to Comparative Example 1 are uniformly saturated with a solution of 500 g of the cross-linker prepared according to Example 3, section A, with 2000 g of acetone, and the product is dried in a whirl dryer by blowing through a dry steam of nitrogen. By using this material, according to the whirl sintering process, coatings may be obtained of a similar good quality as using the powders which were prepared according to Examples 1 and 3.

COMPARATIVE EXAMPLE 1

Example 1 was repeated with the difference that a cross-linker was not added to the saponification solution. The composition of the saponification product can be seen from the accompanying Table. The coatings prepared using this powder according to the whirl sintering process or according to the electrostatic powder coating process were substantially less transparent and glossy than the coatings prepared according to Examples 1 to 3. When heating the coated article to temperatures above 100° C., the coating becomes soft and sticky and after a lengthy heating above the melting point which stands at 106° C., the coating material can be observed to flow.

COMPARATIVE EXAMPLE 2

(A) Preparation of the Cross-Linker Blocked using ε-Caprolactam 310 g of ethylene glycol are added to 2220 g of isophorone diisocyanate at 80° C. during two hours, and the reaction mixture is then heated for another hour to 100° C. In the course of a further two hours, 1120 g of ε-caprolactam are then added from a heated dropping funnel and the reaction mixture is then heated for a further 4 hours to 100° C. While cooling, the melt solidifies into a solid, readily pulverisable material. The melting point lies between 82° and 85° C.

(B) Preparation of the coating powder

Example 1 was repeated while adding 500 parts by weight of the cross-linker, prepared as described above and blocked using ε-caprolactam. The coatings, prepared from this powder, on articles made of metal, glass or ceramics, have approximately the same favourable characteristics as those which were prepared from the products obtained according to Examples 1 to 3, but the quantity of volatile components, released during stoving is substantially greater than with the products mentioned above (Examples 1 to 3).

COMPARISON OF THE RESULTS FROM EXAMPLES 1 TO 3 AND COMPARATIVE EXAMPLES 1 AND 2

Table 2 gives details concerning the weight losses arising when heating the coating powders, prepared according to Examples 1 to 3 and Comparative Examples 1 and 2, to 200° C. in a heating chamber (at normal pressure or under high vacuum). In this Table, in addition to the weight losses during heating established by weighing the layer, the weight losses are also given in weight percent based on the quantity of cross-linker contained in the product. These figures were calculated taking into consideration the slight weight changes of the cross-linker-free material (Comparative Example 1) arising under the conditions of the Experiment. The weight loss based on the cross-linker was calculated according to the following formula:

$$V = 100 \frac{100 \cdot a \cdot (c-d) - (a-b) \cdot c \cdot (100-x)}{a \cdot c \cdot x}$$

in which

V represents weight loss of the cross-linker contained in the powder,
a represents weight of the product to be cross-linked before heating,
b represents weight of the product to be cross-linked after heating,
c represents weight of the product containing the cross-linker before heating,
d represents weight of the product containing the cross-linker after heating,
x represents cross-linker content of the product containing the cross-linker, in % by weight.

TABLE 1

Composition and characteristics of the coating powders

| | | | Example No. 1 | Example No. 2 | Example No. 3 | Comparative Example 1 | Comparative Example 2 |
|---|---|---|---|---|---|---|---|
| (A) | Ethylene-vinyl acetate copolymer used | (g) | 2500 | 2500 | 2500 | 2500 | 2500 |
| | Vinyl acetate content | (% by weight) | 32.0 | 32.0 | 32.0 | 32.0 | 32.0 |
| | Melting index measured according to DIN 53 735 at 150° C. and 2.16 kg load. | (g/10') | 20.0 | 20.0 | 20.0 | 20.0 | 20.0 |
| (B) | Saponification product | (g) | 2145 | 2129 | 2131 | 2129 | 2129 |
| | Composition: | | | | | | |
| | Ethylene | (% by weight) | 79.3 | 80.0 | 79.8 | 80.0 | 80.0 |
| | Vinyl acetate | (% by weight) | 3.5 | 1.7 | 2.1 | 1.7 | 1.7 |
| | Vinyl alcohol | (% by weight) | 17.2 | 18.3 | 18.1 | 18.3 | 18.3 |
| | Hydrolysis level | (%) | 90.6 | 94.7 | 94.4 | 94.7 | 94.7 |
| (C) | Cross-linker | | IPDI | IPDI | IPDI | — | IPDI |
| | Base | | Polycarb-odiimide | Polyret-one imine | Polyret-one imine | — | Diiso-cyanate |
| | Type | | | | | | |
| | Extending agent | | — | — | — | — | Ethylene glycol |
| | Blocking agent | | Methanol | Methanol | Methanol | — | ε-Capro-lactam |
| | Isocyanate group content before use determined at room temperature | (% by weight) | — | 11 | — | — | 0.3 |
| | 180° C. | (% by weight) | — | 17 | 10 | — | 5.5 |
| | Quantity of cross-linker used | (g) | 250 | 250 | 500 | — | 500 |
| (D) | Coating powder Composition: | | | | | | |
| | Saponification product | (% by weight) | 89.6 | 89.5 | 81.0 | 100 | 80.0 |
| | Cross-linker | (% by weight) | 10.4 | 10.5 | 19.0 | — | 20.0 |

TABLE 2

Thermogravimetry of the coating powders at 200° C.

| | | | Example No. 1 | Example No. 2 | Example No. 3 | Comparative Example 1 | Comparative Example 2 |
|---|---|---|---|---|---|---|---|
| (A) | Weight loss of the coating powder at 200° C. | | | | | | |
| | (1) In the heating chamber under normal pressure after 15 minutes | (% by weight) | 0.18 | 0.26 | 0.33 | 0.12 | 0.77 |
| | In the heating chamber under normal pressure after 30 minutes | (% by weight) | 0.35 | 0.53 | 0.75 | 0.12 | 1.54 |
| | In the heating chamber under normal pressure after 45 minutes | (% by weight) | 0.50 | 0.75 | 1.11 | 0.13 | 2.16 |
| | In the heating chamber under normal pressure after 60 minutes | (% by weight) | 0.50 | 0.76 | 1.11 | 0.13 | 2.16 |
| | (2) In the heating chamber at 0.1 mmHg pressure after 15 minutes | (% by weight) | 0.37 | 1.23 | 0.50 | 0.18 | 4.73 |
| | In the heating chamber at 0.1 mmHg pressure after 30 minutes | (% by weight) | 0.60 | 1.30 | 0.73 | 0.22 | 5.74 |
| | In the heating chamber at 0.1 mmHg pressure after 45 minutes | (% by weight) | 0.67 | 1.53 | 0.90 | 0.22 | 6.20 |
| | In the heating chamber at 0.1 mmHg pressure after 60 minutes | (% by weight) | 0.79 | 1.73 | 1.06 | 0.25 | 6.57 |
| | In the heating chamber at 0.1 mmHg | | | | | | |

TABLE 2-continued

| Thermogravimetry of the coating powders at 200° C. | | | | | | |
|---|---|---|---|---|---|---|
| | | Example No. | | | Comparative Example | |
| | | 1 | 2 | 3 | 1 | 2 |
| | pressure after 75 minutes (% by weight) In the heating chamber at 0.1 mmHg | 0.87 | 1.88 | 1.22 | 0.31 | 6.96 |
| | pressure after 90 minutes (% by weight) | 1.15 | 2.15 | 1.51 | 0.31 | 7.11 |
| (B) | Weight loss of the coating powder at 200° C. based on the cross-linker contained therein | | | | | |
| (1) | In the heating chamber under normal pressure after 15 minutes (% by weight) | 0.74 | 1.52 | 1.22 | — | 3.38 |
| | In the heating chamber under normal pressure after 30 minutes (% by weight) | 2.27 | 4.04 | 3.43 | — | 7.22 |
| | In the heating chamber under normal pressure after 45 minutes (% by weight) | 3.55 | 6.04 | 5.25 | — | 10.26 |
| | In the heating chamber under normal pressure after 60 minutes (% by weight) | 3.55 | 6.08 | 5.26 | — | 10.27 |
| (2) | In the heating chamber at 0.1 mmHg pressure after 15 minutes (% by weight) | 2.00 | 10.16 | 1.90 | — | 22.92 |
| | In the heating chamber at 0.1 mmHg pressure after 30 minutes (% by weight) | 3.85 | 10.52 | 2.91 | — | 27.84 |
| | In the heating chamber at 0.1 mmHg pressure after 45 minutes (% by weight) | 4.54 | 12.64 | 3.78 | — | 30.12 |
| | In the heating chamber at 0.1 mmHg pressure after 60 minutes (% by weight) | 5.42 | 14.34 | 4.50 | — | 31.87 |
| | In the heating chamber at 0.1 mmHg pressure after 75 minutes (% by weight) | 6.53 | 16.12 | 5.52 | — | 33.95 |
| | In the heating chamber at 0.1 mmHg pressure after 90 minutes (% by weight) | 8.37 | 17.83 | 6.59 | — | 34.28 |

We claim:

1. Pulverulent coating materials melting at from 60° to 150° C., consisting of
    (a) from 50 to 99% by weight of saponified ethylene-vinyl acetate copolymers, which contain ethylene and vinyl acetate in molar ratios of from 2:1 to 20:1 before saponification and which are saponified to hydrolysis levels of from 50 to 100%, and
    (b) from 1 to 50% by weight of polycarbodiimides, having cross-linking activity above 130° C., of the general formula (1):

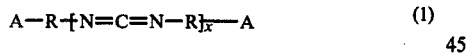

wherein
R represents an alkylene, cycloalkylene, aralkylene or arylene group,
A represents hydrogen or a blocked isocyanate group having dissociation temperatures of above 130° C., and
x represents an integer from 2 to 20,
and/or polyuretone imines, which are obtained by reacting the polycarbodiimides of formula (1) with (cyclo)aliphatic, araliphatic or aromatic di- and/or triisocyanates thereby linking the polycarbodiimide molecules according to the general formulae (2) and (3):

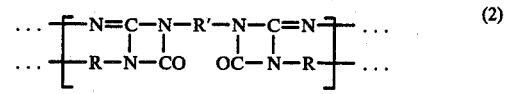

or

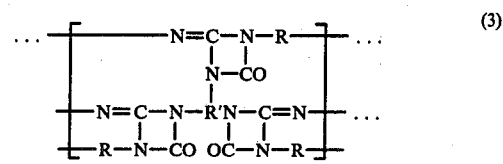

wherein R' represents a bi- or trifunctional organic radical whereby the total of components (a) and (b) amounts to 100% by weight.

2. Coating materials according to claim 1, in which component (a) contains ethylene and vinyl acetate in molar ratios of from 4:1 to 10:1 before saponification.

3. Coating materials according to claim 1, in which A in component (b) is blocked isocyanate group having dissociation temperatures of above 180° C.

4. Coating materials according to claim 1, in which R in component (b) is an optionally substituted cycloalkylene group.

* * * * *

UNITED STATES PATENT AND TRADEMARK OFFICE
CERTIFICATE OF CORRECTION

PATENT NO. : 4,366,288
DATED : December 28, 1982
INVENTOR(S) : Resz et al

It is certified that error appears in the above-identified patent and that said Letters Patent is hereby corrected as shown below:

In the title page, item 75, line 2, "Schäer" should read --Schäfer--

Signed and Sealed this

Thirty-first Day of May 1983

[SEAL]

Attest:

DONALD J. QUIGG

Attesting Officer

Acting Commissioner of Patents and Trademarks